United States Patent
Andrade

(10) Patent No.: US 10,438,293 B2
(45) Date of Patent: Oct. 8, 2019

(54) VEHICLE ESTIMATING SYSTEM THAT UTILIZES VOLUMETRIC FINITE ELEMENT ANALYSIS TO PROVIDE A PREDICTIVE ESTIMATE

(71) Applicant: Audatex North America, Inc., San Diego, CA (US)

(72) Inventor: Flavio Andrade, Arlington, TX (US)

(73) Assignee: Audatex North America, Inc., Addison, TX (US)

( * ) Notice: Subject to any disclaimer, the term of this patent is extended or adjusted under 35 U.S.C. 154(b) by 586 days.

(21) Appl. No.: 15/209,498

(22) Filed: Jul. 13, 2016

(65) Prior Publication Data
US 2017/0024823 A1    Jan. 26, 2017

Related U.S. Application Data

(60) Provisional application No. 62/194,769, filed on Jul. 20, 2015, provisional application No. 62/198,668, filed on Jul. 29, 2015.

(51) Int. Cl.
*G06Q 40/00*    (2012.01)
*G06Q 40/08*    (2012.01)

(52) U.S. Cl.
CPC .................. *G06Q 40/08* (2013.01)

(58) Field of Classification Search
CPC ............................ G06G 40/00; G06G 40/08
See application file for complete search history.

(56) References Cited

U.S. PATENT DOCUMENTS

| | | | |
|---|---|---|---|
| 8,571,958 B2 * | 10/2013 | Oldham | G06Q 40/00 705/35 |
| 9,218,626 B1 * | 12/2015 | Haller, Jr. | G06Q 40/08 |
| 9,824,453 B1 * | 11/2017 | Collins | G06F 16/5838 |
| 9,886,771 B1 * | 2/2018 | Chen | G06T 7/0032 |
| 2010/0118025 A1 * | 5/2010 | Smith | G06Q 30/02 345/418 |
| 2014/0200930 A1 * | 7/2014 | Zizzamia | G06F 17/18 705/4 |

(Continued)

OTHER PUBLICATIONS

Independent Automotive Damage Appraisers Association (IADA) Signs National Agreement with Audatex North America Inc Business Wire Apr. 27, 2009: NA.*

*Primary Examiner* — Lalita M Hamilton
(74) *Attorney, Agent, or Firm* — Baker Botts L.L.P.

(57) ABSTRACT

An apparatus and method that provides a predictive estimate for a damaged vehicle. The apparatus includes an input for receiving a three-dimensional map of a damaged vehicle and memory for storing a three-dimensional map of an undamaged vehicle. The memory also contains a database the contains predictive estimates for a variety of previously generated volumetric deltas and previously generated penetration ratios. The apparatus further includes a processor that generates a volumetric delta from the three-dimensional map of the damaged vehicle and the three-dimensional map of the undamaged vehicle, generates a penetration ratio, and then provides a predictive estimate by comparing the generated volumetric delta and penetration ratio with the previously generated volumetric deltas and previously generated penetration ratios in the database.

21 Claims, 5 Drawing Sheets

Real Vehicle

Point Cloud

3D Object

(56) References Cited

U.S. PATENT DOCUMENTS

| | | | |
|---|---|---|---|
| 2015/0066349 A1* | 3/2015 | Chan | G01C 21/3407 |
| | | | 701/400 |
| 2015/0106133 A1* | 4/2015 | Smith, Jr. | G06Q 40/08 |
| | | | 705/4 |
| 2016/0071217 A1* | 3/2016 | Edwards | G06Q 40/08 |
| | | | 705/4 |

* cited by examiner

| Claim # : 2345634523541234 | Desc: | Status: Assigned | Gross Total: |

VIN Selection

| Assignment VIN | Inspection VIN  *102* | Reason For No VIN |
|---|---|---|
| [      ] Copy | WDBWK54F86F121718 | [       ▽] |

AudaVIN Information Received.

Vehicle Information

⦿ Vehicle Selection  *104*  ○ Vehicle Not Listed

| Origin: | European ▽ | Make: | Mercedes-Benz ▽ *106* | Year: | 2006 ▽ *108* |
|---|---|---|---|---|---|
| Model: | SLK280 ▽ *110* | Style: | STD 2D Convertible 2WD Gasoline ▽ *112* | | |
| Engine: | 6cyl Gasoline 3.0 ▽ | Transmission: | 7-Speed Automatic ▽ | | |
| Mileage: | [   ] *114* | Typical Mileage: | [   ] *116* | Mileage Type: | Actual ▽ |

Other Vehicle Information

| Lic. Plate: [   ] | Lic. State: [   ▽] | Lic. Expire: [   ] |
|---|---|---|
| Condition: [ ▽] | Veh Insp#: [   ] | Prod Date: [   ] |

| | Paint Code | Color |
|---|---|---|
| Exterior: | [   ] | [   ] |
| Interior Trim: | [   ] | [   ] |

---

| Claim # : 2345634523541234 | Desc: | Status: Assigned | Gross Total: |
| 2006 Mercedes-Benz SLK280 | Packages and Options  Aftermarket Items | | |

Packages | Package Description

☐ Comfort Package(T)
☐ Heating Package(T)
☑ *Premium Package*
☐ Wood Trim Package

*Comfort Package(T):*
-Includes Automatic Dimming Mirror, Driver Seat Memory, Dual Power Seats, Pwr Tilt/Tele. Str Wheel
*Heating Package(T):*
-Included Heated Front Seats, AIRSCARF Ventilated Headrest
*Premium Package:*

Options

Optional Equipment
- ☐ Automatic Dimming Mirror(T)
- ☐ Driver Seat Memory(T)
- ☐ Headlight Washers
- ☑ *AM/FM In-dash CD Changer*
- ☐ Navigation System
- ☑ *Rain-Sensing W/S Wipers*
- ☐ Wood Interior Trim

- ☐ Cargo/Trunk Liner
- ☐ Dual Power Seats(T)
- ☐ Heated Front Seats(T)
- ☐ Leather/Wood Steer Wheel
- ☐ Pwr Tilt/Tele. Str Wheel(T)
- ☐ Sirius Satellite Radio
- ☐ Xenon Headstamps

- ☐ Cellular Telephone
- ☑ *Garage Door Opener*
- ☐ Harman Kardon Sound Sys
- ☑ *Metallic Paint*
- ☐ Run-Flat/Self-Seal Tires
- ☐ Tire Pressure Monitor Optional Equipment
- ☑ *Anti-lock Brakes*
- ☑ *Air Conditioning*
- ☑ *Alarm System*

☐ None    (S)Standard, (T) - Typical    *100*

VEHICLE ESTIMATING SYSTEM THAT UTILIZES VOLUMETRIC FINITE ELEMENT ANALYSIS TO PROVIDE A PREDICTIVE ESTIMATE

CROSS-REFERENCE TO RELATED APPLICATIONS

This application claims the benefit of U.S. patent application No. 62/194,769 filed on Jul. 20, 2015 and U.S. patent application No. 62/198,668 filed on Jul. 29, 2015, both of which are incorporated herein in their entirety.

BACKGROUND OF THE INVENTION

1. Field of the Invention

The subject matter disclosed generally relates to a method and system for automatically generating a repair estimate for a damaged vehicle.

2. Background Information

When a vehicle such as an automobile is damaged the owner may file a claim with an insurance carrier. A representative typically inspects the vehicle to determine the amount of damage and the costs required to repair the automobile. The owner of the vehicle or the vehicle repair facility may receive a check equal to the estimated cost of the repairs. If the repair costs exceed the value of the automobile, or a percentage of the car's value, the representative may "total" the vehicle. The owner may then receive a check based on the value of the automobile.

The repair costs and other information may be entered by the representative into an estimate report. After inspection the representative sends the estimate report to a home office for approval. To improve the efficiency of the claims process there have been developed computer systems and accompanying software that automate the estimate process. By way of example, the assignee of the present invention, Audatex, Inc., ("Audatex") provides a software product under the trademark Audatex Estimating that allows a representative to enter claim data. The product will display parts list that can be selected by the estimator to build an estimate to repair the vehicle. The software will automatically list the price of any selected part with associated labor cost. Such a manual process is time consuming and subject to human error.

BRIEF SUMMARY OF THE INVENTION

An apparatus and method that provides a predictive estimate for a damaged vehicle. The apparatus includes an input for receiving a three-dimensional map of a damaged vehicle and memory for storing a three-dimensional map of an undamaged vehicle. The memory also contains a database the contains predictive estimates for a variety of previously generated volumetric deltas and previously generated penetration ratios. The apparatus further includes a processor that generates a volumetric delta from the three-dimensional map of the damaged vehicle and the three-dimensional map of the undamaged vehicle, generates a penetration ratio, and then provides a predictive estimate by comparing the generated volumetric delta and penetration ratio with the previously generated volumetric deltas and previously generated penetration ratios in the database.

BRIEF DESCRIPTION OF THE DRAWINGS

FIG. 7 is an illustration of a estimating page with different vehicle information fields; and, FIG. 8 is an illustration of graphical user interface that displays repair estimate of the damaged vehicle.

DETAILED DESCRIPTION

Disclosed is a system and method for automatically generating repair estimate for a damaged vehicle. The system generates the estimate by initially comparing a three-dimensional map of a damaged vehicle with a three-dimensional map of a like undamaged vehicle. A volumetric finite element method is employed to determine a change in the volume of the vehicle (volumetric delta) and the amount of penetration at a point of impact (penetration ratio). A database is searched to find estimate data associated with a like vehicle that has the same or similar volumetric delta and penetration ratio. The estimate data is then provided as a predictive estimate.

Figure 1:
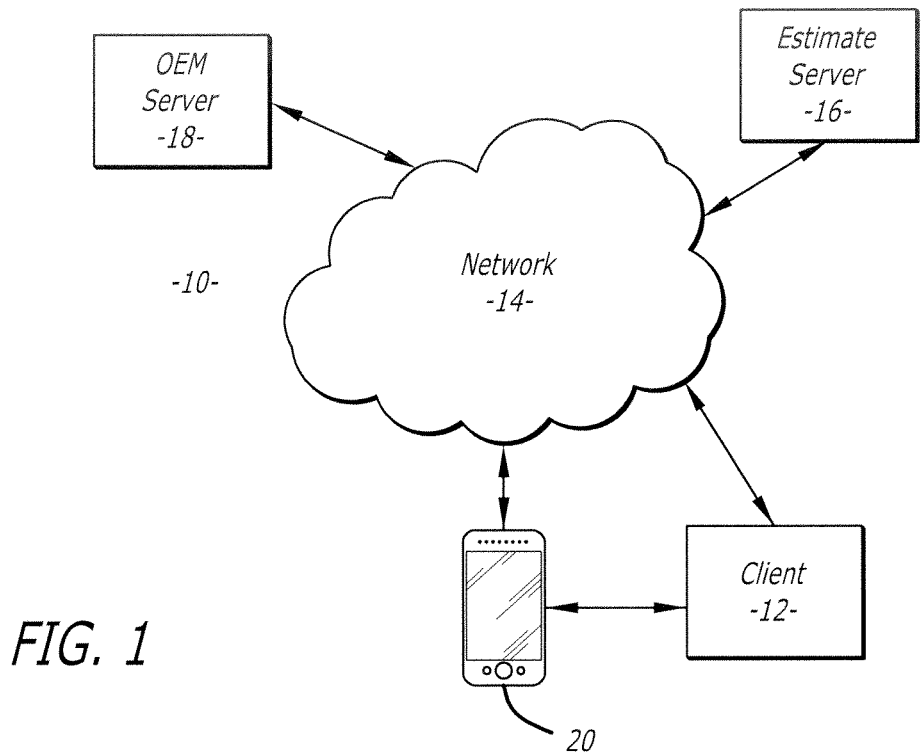
FIG. 1 is a schematic of a system that can be used obtain a predictive estimate for a damaged vehicle.

Referring to the drawings more particularly by reference numbers, FIG. 1 shows a system 10 that can be used to automatically generate a repair estimate for a damaged vehicle. The system 10 may include at least one client 12 that is connected to an electronic communication network 14. The electronic communication network 14 may be a wide area network (WAN) such as the Internet. Accordingly, communication may be transmitted through the network 14 in TCP/IP format. The client 12 could be any type of device that can access the network 14.

The system 10 may further include an claim server 16 connected to the network 14. The claim server 16 may provide a web based portal that provides access to a repair cost estimate. The web site may provide one or more web pages that can be used by a representative to generate a repair cost estimate. By way of example, the representative may utilize the web pages to determine the estimate. Although one claim server 16 is shown, it is to be understood that the claim server may include two or more separate servers including a web server and an application server that together perform various functions.

The system may also include an OEM server 18 that can be coupled to the claim server 16 and clients 12 through the network 14. The OEM server 18 may contain a database that includes vehicle model information and vehicle option information. The OEM server 18 may provide vehicle model information and vehicle options information based on a VIN. Although a web based system is shown and described, it is to be understood that a non-web based system could be employed.

The system 10 may also include a camera device 20 that can be used to capture a three dimensional image of a vehicle. The device 20 may be a smartphone, tablet or a similar device that contains a camera, etc. The camera device 20 may be coupled to the client 12.

Figure 2:
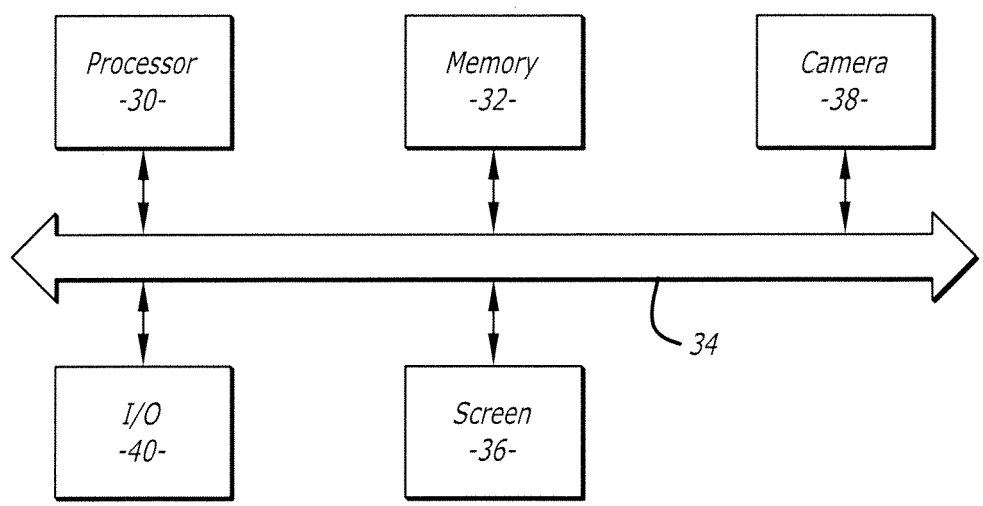
FIG. 2 is a schematic of an architecture for components of the system.

FIG. 2 shows an overall architecture of the client 12, servers 16 and 18 and/or camera 20. The architecture includes a processor 30 connected to one or more memory devices 32 through a bus 34. The memory device 32 may include both volatile and non-volatile memory such as read only memory (ROM) or random access memory (RAM). The processor 30 is capable of operating software programs in accordance with instructions and data stored within the memory device 32. Without limiting the scope of the invention the term computer readable medium may include the memory device 32. The computer readable medium may contain software programs in binary form that can be read and manipulated by the processor 30.

The architecture further includes a screen 36 and a camera 38. The architecture may also include input/output (I/O) to allow for communication with external sources. For example, the client 12 may have I/O 40 that receives a three-dimensional image from the camera 20.

The servers 16 and 18 may contain relational databases that correlate data with individual data fields and a relational database management system (RDBMS). The RDBMS of the server 16 may include a reference to a website that can be accessed by the client 12 and/or camera device 20. The website has one or more specific uniform resource locators (URL) that can be used to access the site through the network 14. The URL can be entered through a web-based application resident in the client computer 12 and/or device 20. By way of example, the web based application may be a browser. Servers 16 and/or 18 contain databases and algorithms that generate a predictive estimate utilizing volumetric deltas and penetration ratios.

Figure 3:
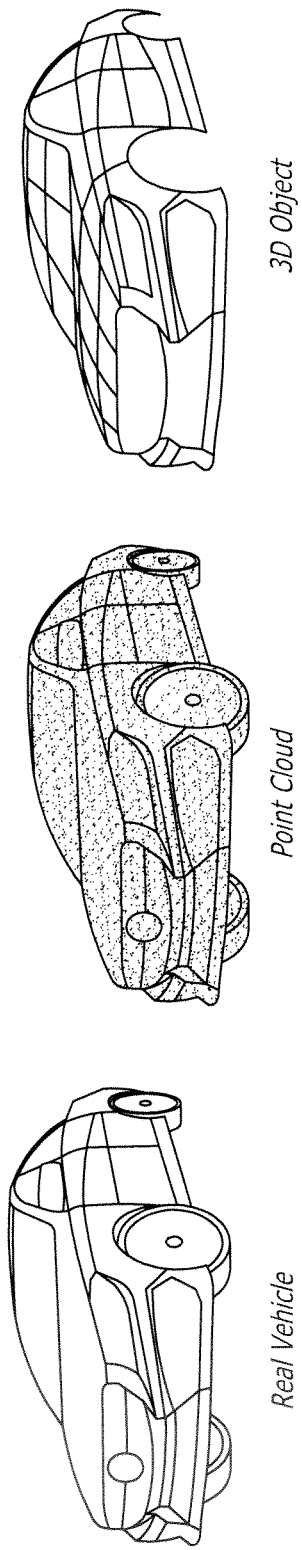
FIG. 3 is an illustration showing three-dimensional image data of an undamaged vehicle.

The following is a discussion on the predictive estimate method used to generate an estimate to repair a damaged vehicle. FIG. 3 shows various three-dimensional maps including a point cloud, a CAD file, or any other file that contains three-dimensional image data of an undamaged vehicle. Three-dimensional map files of various undamaged vehicle models can be stored in a database(s). When a vehicle is damaged a user can obtain a three-dimensional image of the damaged vehicle. This can be done with a three-dimensional camera. Likewise, the three-dimensional image can be generated by mapping 2-D data from a two-dimensional image to 3-D, for example, with various point cloud techniques.

Figure 4:
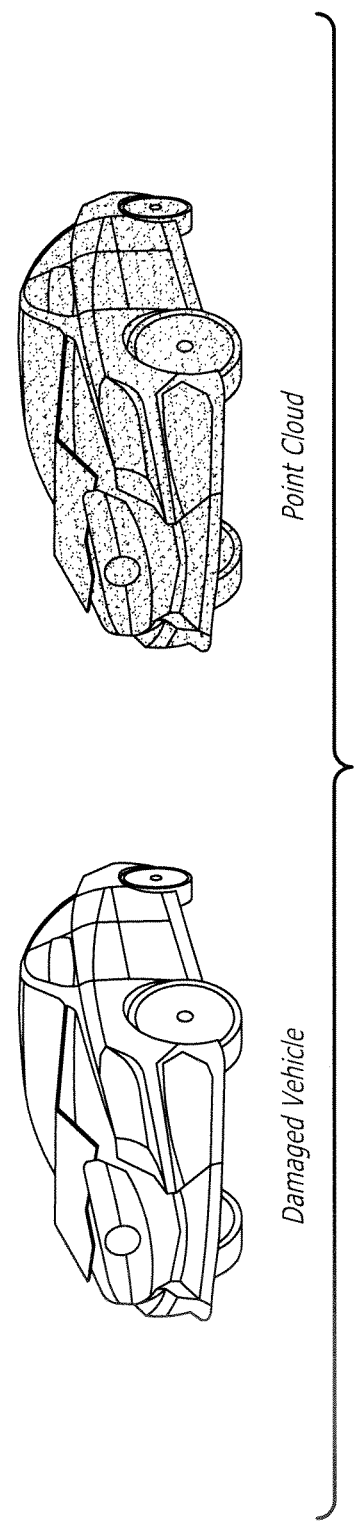
FIG. 4 is an illustration showing a volumetric delta between a damaged vehicle and an undamaged vehicle.

A volumetric delta between the damaged vehicle and an undamaged vehicle can be generated using volumetric finite element analysis of the three-dimensional maps. The finite element analysis can be performed by decomposing the surfaces into finite elements, possibly as small as the resolution of the three-dimensional images. The volumes of the damaged and undamaged vehicles can be calculated from one end of the vehicle to another end. The difference between the volume of the damaged vehicle and the undamaged vehicle is the volumetric delta. FIG. 4 depicts a graphical representation of the volumetric delta between an undamaged vehicle and damaged vehicle. The volumetric delta reflects the surface area of the vehicle that has been damaged.

Figure 5:
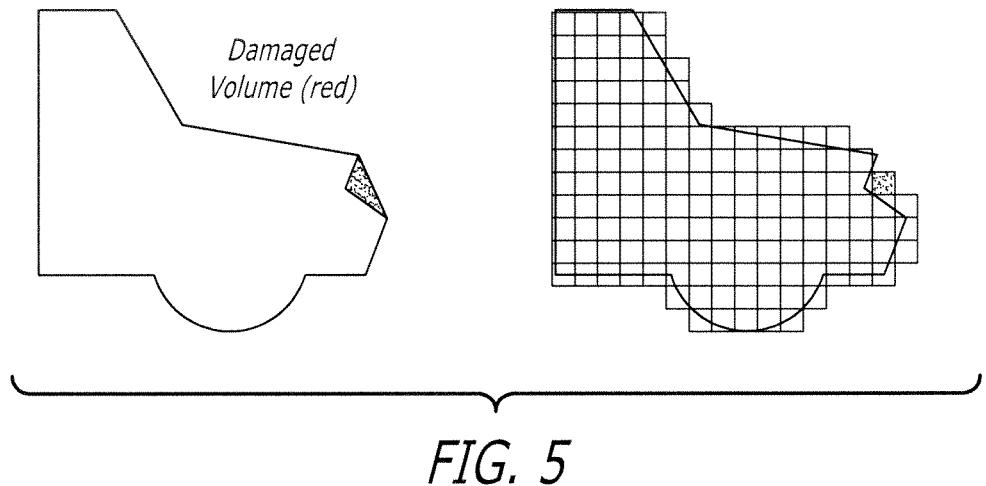
FIG. 5 is an illustration showing a vehicle defined by finite elements.

It is also useful to obtain data regarding the depth of damage to the vehicle. A penetration ratio can be utilized and be defined by a maximum depth divided by the damaged surface area. The damaged surface area can be calculated by determining the area of finite elements of the damaged vehicle that are different from the finite elements of a undamaged vehicle. This is illustrated in FIG. 5.

Figure 6:
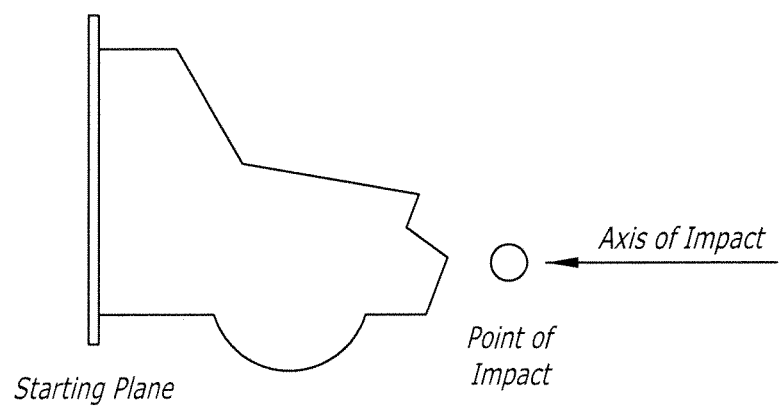
FIG. 6 is an illustration used for a penetration analysis includes the step of defining an axis of impact and defining a plane of the vehicle that is orthogonal to the impact axis.

As shown in FIG. 6 the penetration analysis includes the step of defining an axis of impact and defining a plane of the vehicle that is orthogonal to the impact axis. The axis of impact can be defined by the user from a visual inspection of the vehicle. The distance along the axis of impact between a damaged vehicle and an undamaged vehicle can be computed using finite element analysis. The largest distance can be defined as the maximum depth. The penetration ratio can then be computed by dividing the maximum depth by the damaged surface.

A database that contains historical repair estimates with corresponding volumetric deltas and penetration ratios can be generated with previous estimates for various vehicle types and models. The volumetric delta and penetration ratio numbers for a damaged vehicle can be compared with respective data in the database to obtain a predictive estimate.

The predictive estimate can be incorporated into a system used to generate repair estimates. FIG. 7 shows an example of an claim page 100 used to create an insurance estimate. The claim page may include a VIN field 102 that allows a user to enter a VIN. The page 100 may include vehicle information fields, including but not limited to ORIGIN 104, MAKE 106, YEAR 108, MODEL 110, STYLE 112, ENGINE 114 and TRANSMISSION 116, exterior and interior Paint code, color, refinish type and production date fields. The page may further include vehicle package fields 118 and vehicle option fields 120 that can be selected and deselected to indicate the options of a vehicle. Entering the VIN may automatically populate certain fields of the page 100.

Figure 8:
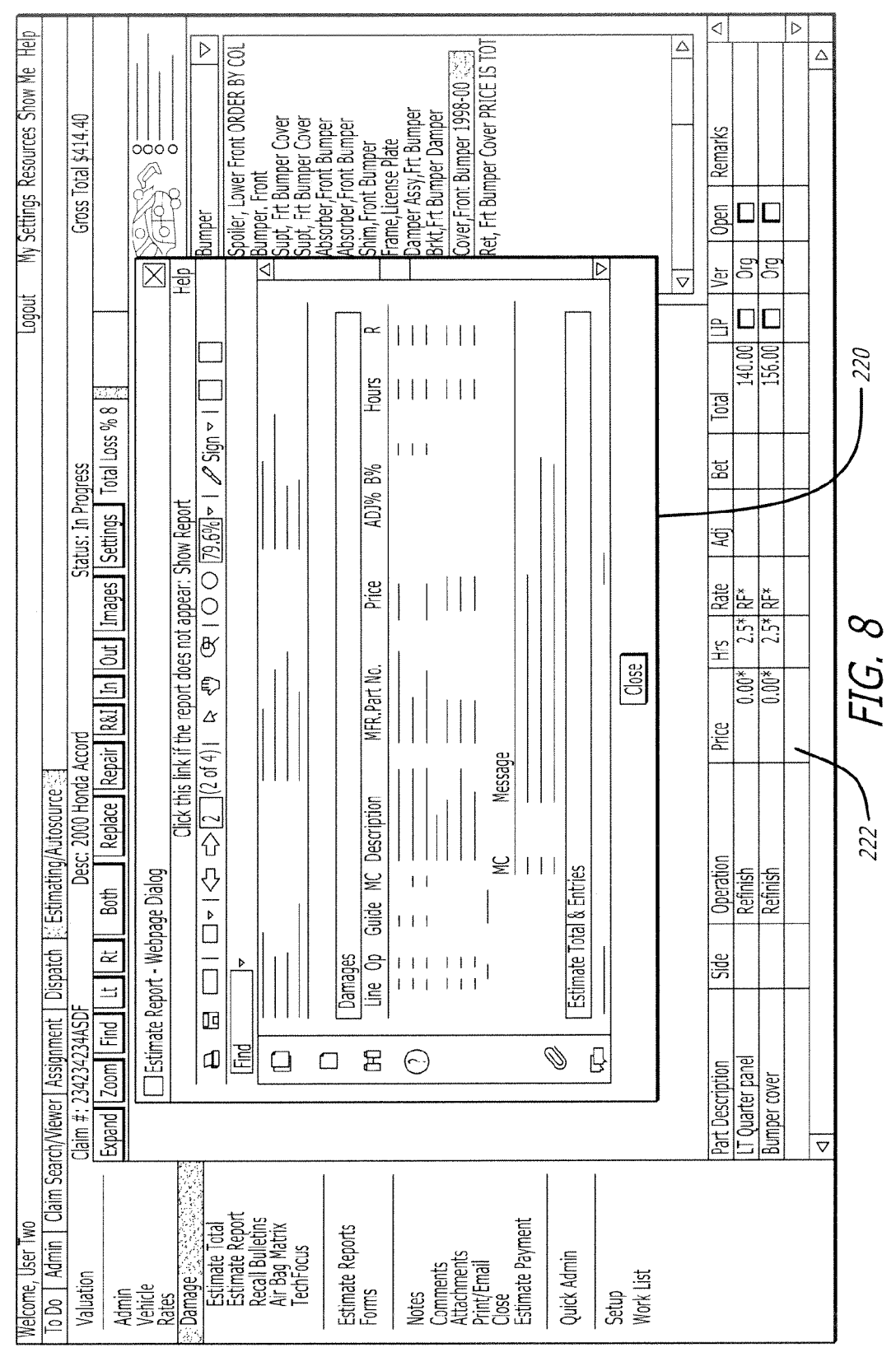

FIG. 8 shows a page 220 that displays predictive estimate. The page 220 includes fields that display part and labor costs for repairing the vehicle in field 222. The process may have a feature (not shown) that provides a warning to the representative that the cost total exceeds a "totaled" value at which point the representative may discontinue the process and request a vehicle valuation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus that provides a predictive estimate for a damaged vehicle, comprising:
    an input for receiving a three-dimensional map of a damaged vehicle;
    memory for storing a three-dimensional map of an undamaged vehicle, said memory also contains a database the contains predictive estimates for a variety of previously generated volumetric deltas and previously generated penetration ratios; and,
    a processor that generates a volumetric delta from the three-dimensional map of the damaged vehicle and the three-dimensional map of the undamaged vehicle, generates a penetration ratio, and then provides a predictive estimate by comparing the generated volumetric delta and penetration ratio with the previously generated volumetric deltas and previously generated penetration ratios in the database, said predictive estimate is displayed on a graphical user interface that includes estimates for part and labor costs.

2. The apparatus of claim 1, wherein the three-dimensional maps of the damaged and undamaged vehicles are defined by finite elements.

3. The apparatus of claim 1, wherein the penetration ratio is calculated as a maximum depth divided by a damaged surface area.

4. The apparatus of claim 3, wherein maximum depth is calculated along an axis of impact.

5. The apparatus of claim 3, wherein the damaged surface area is determined from a difference between the three-dimensional maps of the damaged vehicle and the undamaged vehicle.

6. The apparatus of claim 5, wherein the three-dimensional maps of the damaged and undamaged vehicles are defined by finite elements.

7. The apparatus of claim 6, wherein the maximum depth is calculated by comparing the three-dimensional maps of the damaged and undamaged vehicles.

8. A non-transitory computer program storage medium, comprising computer-readable instructions for providing a predictive estimate for a damaged vehicle, execution of said computer-readable instructions by at least one processor performs the steps:
    storing in memory a three-dimensional map of an undamaged vehicle and a database the contains predictive estimates for a variety of previously generated volumetric deltas and previously generated penetration ratios;
    receiving a three-dimensional map of a damaged vehicle through an input; and,
    generating with a processor a volumetric delta from the three-dimensional map of the damaged vehicle and the three-dimensional map of the undamaged vehicle, generating a penetration ratio, and then providing a predictive estimate by comparing the generated volumetric delta and penetration ratio with the previously generated volumetric deltas and previously generated penetration ratios in the database, said predictive estimate is displayed on a graphical user interface that includes estimates for part and labor costs.

9. The non-transitory computer program storage medium of claim 8, wherein the three-dimensional maps of the damaged and undamaged vehicles are defined by finite elements.

10. The non-transitory computer program storage medium of claim 8, wherein the penetration ratio is calculated as a maximum depth divided by a damaged surface area.

11. The non-transitory computer program storage medium of claim 10, wherein the damaged surface area is determined from a difference between the three-dimensional maps of the damaged vehicle and the undamaged vehicle.

12. The non-transitory computer program storage medium of claim 11, wherein the three-dimensional maps of the damaged and undamaged vehicles are defined by finite elements.

13. The non-transitory computer program storage medium of claim 12, wherein the maximum depth is calculated by comparing the three-dimensional maps of the damaged and undamaged vehicles.

14. The non-transitory computer program storage medium of claim 10, wherein maximum depth is calculated along an axis of impact.

15. A method for providing a predictive estimate for a damaged vehicle, comprising;
    storing in memory a three-dimensional map of an undamaged vehicle and a database the contains predictive estimates for a variety of previously generated volumetric deltas and previously generated penetration ratios;
    receiving a three-dimensional map of a damaged vehicle through an input; and,
    generating with a processor a volumetric delta from the three-dimensional map of the damaged vehicle and the three-dimensional map of the undamaged vehicle, generating a penetration ratio, and then providing a predictive estimate by comparing the generated volumetric delta and penetration ratio with the previously generated volumetric deltas and previously generated penetration ratios in the database, said predictive estimate is displayed on a graphical user interface that includes estimates for part and labor costs.

16. The method of claim 15, wherein the three-dimensional maps of the damaged and undamaged vehicles are defined by finite elements.

17. The method of claim 15, wherein the penetration ratio is calculated as a maximum depth divided by a damaged surface area.

18. The method of claim 17, wherein the damaged surface area is determined from a difference between the three-dimensional maps of the damaged vehicle and the undamaged vehicle.

19. The method of claim 18, wherein the three-dimensional maps of the damaged and undamaged vehicles are defined by finite elements.

20. The method of claim 19, wherein the maximum depth is calculated by comparing the three-dimensional maps of the damaged and undamaged vehicles.

21. The method of claim 17, wherein maximum depth is calculated along an axis of impact.

* * * * *